Feb. 23, 1937.                J. FLAWS, JR                2,071,941
                    CONTROLLING DEVICE FOR MECHANISMS
                          Filed April 23, 1936
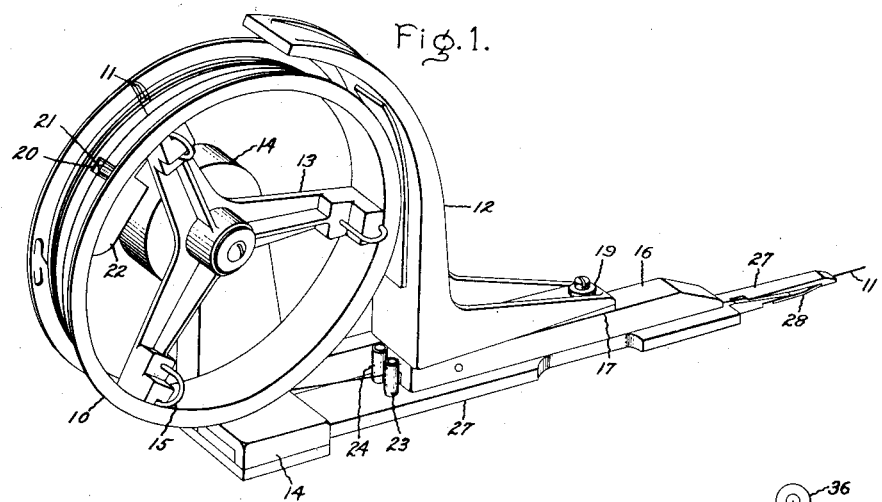
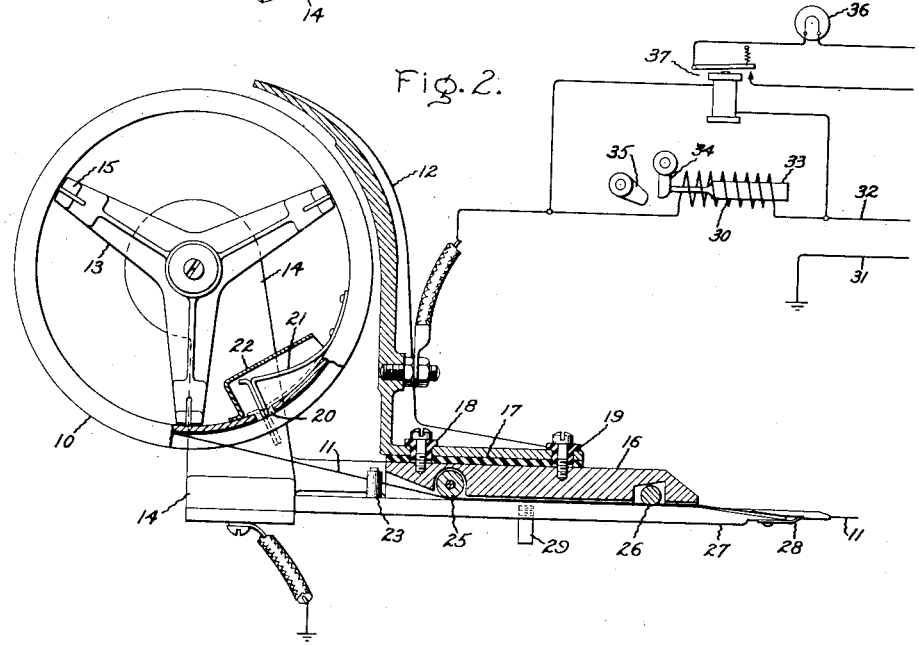
Inventor:
John Flaws Jr.,
by Harry E. Dunham
His Attorney.

Patented Feb. 23, 1937

2,071,941

UNITED STATES PATENT OFFICE 2,071,941

CONTROLLING DEVICE FOR MECHANISMS

John Flaws, Jr., Cleveland Heights, Ohio, assignor to General Electric Company, a corporation of New York Application April 23, 1936, Serial No. 76,083

4 Claims. (Cl. 192—127)

My invention relates to apparatus for causing an alarm and for discontinuing operation of associated mechanism as the completion of the unwinding of a wire or thread occurs. This is necessary in high speed automatic machines to prevent the manufacture of defective articles. The apparatus is also particularly useful in machines for making stems for electric lamps as these machines cannot be stopped while some stems are in the process of manufacture, and my apparatus can be used to stop the feeding of new materials into the machine as those already in are traveling through it. To stop the machine with stems in the process of manufacture would cause said stems to be melted down by the fires thereof.

According to my invention I provide a finger mounted on the spool carrying the wire which is pressed down to one position by said wire and which springs outwardly to another position when the wire is used up. The finger and a guard located adjacent the spool are connected in a circuit including an alarm producing mechanism and are caused to contact each other to complete the circuit and give the alarm as the spool is rotated by the withdrawal of wire therefrom. Means are also provided in the electrical circuit for discontinuing the operating of other mechanism of the stem machine when the wire is used up. Other features and advantages of my invention will be apparent from the detailed description which follows and from the drawing.

In the drawing Fig. 1 is a perspective view of the control elements of the empty spool alarm of my invention and associated parts; and Fig. 2 is a side elevation thereof with some parts shown in section and with the wiring diagram therefor.

My device is composed of a spool 10 which carries a quantity of wire 11 or other string of material wound thereabout and the guard 12 which is mounted adjacent thereto. The spool 10 is mounted on the hub 13 which in turn is mounted on a shaft (not shown) extending from bracket 14. The spokes of the hub 13 are provided with U-shaped springs 15 which frictionally engage the inner surface of the spool 10. The guard 12 is mounted on the block 16 which is insulated therefrom by the plate 17 and washers 18 and 19 and which is attached to bracket 14. The wire 11 is carried on the base of the spool 10 and is wound over the aperture 20 therein which allows the spring finger 21 to engage said wire. The spring finger 21 is attached to the inner surface of the spool 10 and is provided with a radially extending portion which contacts the wire. The shape of the finger 21 is such that the radially extending portion will spring outwardly when the wire 11 in contact therewith is removed. A guard 22 is fastened to the spool 10 to protect the finger 21.

In the instance shown, my device is incorporated with a portion of the mechanism for inserting support wires into the stems of incandescent lamps or the like, the full operation being the cutting and forming of wire 11 into support wires and the inserting of said wires into the stems. This mechanism in turn is only a portion of a high speed automatic machine for stem making and filament mounting as shown in Flaws Patent 1,907,533 which issued May 9, 1933. The mechanism shown pulls the wire 11 from the spool 10 once it is threaded between the rolls 23 and 24, through the slot in block 16, below rollers 25 and 26, through the groove in slide 27 and between the resilient finger 28 and said slide 27. Rollers 23 and 24 are mounted on slide 27 and, like roller 25 which is mounted on block 16, serve to guide the wire 11. Roller 26 floats in a pocket in block 16 and with finger 28 grips the wire at intervals so that it is moved properly. The feeding operation is brought about by a reciprocating movement of slide 27 with reference to bracket 14 and block 16 which is produced by apparatus (not shown) engaging pin 29. With the movement of slide 27 to the right, the wire 11 is gripped by the finger 28 and is pulled from the spool 10. With the movement of the slide 27 to the left, the wire 11 is gripped between the roller 26 and said slide 27 which hold it stationary and the slide 27 shifts to a new position on the wire. The gripping action of the roller 26 results from the first movement of the wire 11 and slide 27 which pulls the roller 26 into the shallower portion of its pocket in block 16 and thereafter the wire 11 slips on the slide 27.

The alarm is given when sufficient wire 11 is unwound from the spool 10 to allow the finger 21 to spring outwardly to the position shown in dotted lines and when the spool 10 is turned so that it contacts the guard 12. In the instance shown, the finger 21 is narrower than the base of the spool 10 and several turns of the wire 11 adjacent the end thereof are purposely wound to one side of the aperture so that some wire will still remain on the spool when the finger springs outwardly. This construction is not required but enables support wires to be added to the remaining stems in the stem machine before the wire is completely used up.

The finger 21 and guard 12 are the control elements for means which automatically stop further feeding of lamp parts into the stem machine. By this method of operating, the machine is allowed to operate until all the lamp parts already in the process of manufacture are completed. A circuit through solenoid 30 is completed when finger 21 touches guard 12, as the finger 21 is grounded through the machine parts which connect it to the one side 31 of the line which is also grounded, and as the guard is connected through the solenoid 30 to the other side 32 of the line. The armature 33 of the solenoid 30 pushes the end of arm 34 into position above arm 35 if the circuit is closed. Arm 35 in this instance is connected to a flare feeding mechanism and if prevented from swinging upward by arm 34, makes said mechanism inoperative. The particular flare feeding mechanism used is shown in Fagan et al. Patent 1,597,439 which issued August 24, 1926 and which discloses similar means for causing the mechanism to be inoperative. A warning lamp 36 is provided which is connected to an outside source of electricity and which is controlled by the relay 37. The relay 37 is connected to the leads of the solenoid 30 as shown.

What I claim as new and desire to secure by Letters Patent of the United States is:

1. The apparatus for causing an alarm when the last of a wire is unwound from a spool comprising a spool having a base with an aperture therein over which the wire is wound, means for rotatably mounting said spool so that it can be turned and the wire unwound, a finger mounted radially inward from said aperture in the base of the spool and adapted to turn therewith, means for pushing said finger outward radially through said aperture and against the wire and for causing said finger to spring still further outward when the wire is completely unwound from the spool, a guard mounted adjacent to the periphery of the spool and adapted to contact the finger as the spool is turned when the finger is in the outermost position, an electrical circuit including said finger and said guard and means connected in said circuit for giving an alarm when the circuit is completed by the finger contacting the guard.

2. The apparatus for causing an alarm when the last of a wire is unwound from a spool comprising a spool having a base with an aperture therein of less width than said base over which the wire is wound, means for rotatably mounting said spool so that it can be turned and the wire unwound, a finger mounted radially inward from said aperture in the base of the spool and adapted to turn therewith, means for pushing said finger outward radially through said aperture and against the wire and for causing said finger to spring still further outward when the wire directly over the aperture is unwound from the spool, a guard mounted adjacent to the periphery of the spool and adapted to contact the finger as the spool is turned when the finger is in the outermost position, an electrical circuit including said finger and said guard and means connected in said circuit for giving an alarm when the circuit is completed by the finger contacting the guard.

3. The apparatus for causing an alarm when the last of a wire is unwound from a spool comprising a spool having a base with an aperture therein over which the wire is wound, means for rotatably mounting said spool so that it can be turned and the wire unwound, a spring finger mounted on said spool adjacent said aperture therein and extending through said aperture and into contact with the wire and adapted to spring outward further when the wire is completely unwound from the spool, a guard mounted adjacent to the periphery of the spool and adapted to contact the finger as the spool is turned when the finger is in the outermost position, an electrical circuit including said finger and said guard and means connected in said circuit for giving an alarm when the circuit is completed by the finger contacting the guard.

4. The mechanism for feeding wire to a support wire inserting mechanism for an incandescent lamp making machine comprising a spool having a base with an aperture therein over which one end of a wire is wound, a hub upon which said spool is mounted, a bracket on which said hub is rotatably mounted, a slide mounted adjacent to said bracket and adapted to be reciprocated forward and backward, means mounted on said slide for gripping the free end of the wire extending from the spool and for causing it to move with the said slide on the forward movement thereof so that wire is pulled from the spool, means mounted on the bracket for gripping the free end of the wire and for preventing it from moving backward with the corresponding movement of the slide so that the wire is advanced through the means on said slide, a finger mounted radially inward from said aperture in the base of the spool and adapted to turn therewith, means for pushing said finger outward radially through said aperture and against the wire and for causing said finger to spring still further outward when the wire is completely unwound from the spool, a guard mounted on the bracket adjacent to the periphery of the spool and adapted to contact the finger as the spool is turned when the finger is in the outermost position, an electrical circuit including the finger and the guard and means connected in said circuit for causing another mechanism in the lamp making machine to become inoperative when the circuit is completed by the finger contacting the guard as the wire runs out.

JOHN FLAWS, Jr.